May 17, 1960   J. R. M. McNALLY   2,937,355
NON-INDUCTIVE WOUND RESISTORS
Filed Dec. 18, 1958

United States Patent Office 2,937,355
Patented May 17, 1960

2,937,355

NON-INDUCTIVE WOUND RESISTORS

Jack Reginald Moore McNally, Glenrothes, Scotland, assignor to Electrothermal Engineering Limited, London, England, a British company Application December 18, 1958, Serial No. 781,348

Claims priority, application Great Britain December 23, 1957

15 Claims. (Cl. 338—62)

This invention relates to low-inductance wound resistors.

When a square-fronted voltage step is applied to a wound resistor, even one designed to have a low inductance and therefore a low time constant, the current does not immediately assume its steady-state value, determined by the ratio of voltage to resistance, that is to say the current rise is not square-fronted also. Instead, the current may rise fairly steeply above the steady state value and then oscillate about that value, the oscillations gradually dying away until the steady state is reached, or, alternatively, the current may rise to the steady state value without oscillations but over an appreciable period of time. It is very desirable that it should be possible to provide a low-inductance wound resistor in which, as compared with conventional low-inductance resistors, the amplitude of the oscillations, if they occur, will fall to a particular small percentage of the steady-state current increment in a shorter time, or, if the oscillations do not occur, the current attains a value within a particular small percentage of the steady state value in a shorter time.

According to the invention there is provided a non-inductive wound resistor comprising two spaced, parallel, plate-like, metallic portions, a further portion extending between said metallic portions and a low-inductance, multi-layer winding surrounding said further portion and disposed between said metallic portions with each end of each winding layer very closely adjacent one of said metallic portions.

Throughout the present specification and claims a "multi-layer" winding is to be understood to mean one having two or more layers.

Several methods of winding wire resistors to achieve a substantially zero inductance are already known, and some are briefly indicated below, together with names by which they are sometimes known.

The "bifilar winding" employs a single length of wire which is doubled before being wound on to a core, the result being that the area enclosed by the "loop" carrying the current is small. A bifilar winding can also be made by winding two lengths of wire together round a core, the lengths being jointed at one end before or after the winding operation.

An Ayrton-Perry winding has two equal lengths of wire, one layer forming an even helix of one direction, and the other forming an even helix of the opposite direction, disposed outside the first helix. The two lengths of wire are connected in parallel.

A Chaperon winding has an even number of layers of wire in series, the direction of winding being reversed at the end of each layer so that the number of clockwise turns equals the number of anticlockwise turns.

A woven-wire resistor of low-inductance is described by Duddell and Mather in the specification of British Patent No. 5171/1901.

A Wenner winding has a main core, and, extending parallel with it, an auxiliary core or cord. The wire is wound one turn around the main core, looped around the auxiliary core or cord and then wound one turn in the opposite direction around the main core, whereafter it is looped around the auxiliary core or cord and so on.

A "reversed-section" winding has a core which is divided by partitions in planes perpendicular to the axis of the core into a plurality of winding sections. The direction of winding the wire alternates from section to section.

A "coiled-coil" winding has wire wound on to a flexible insulating core of small diameter, this coil then being wound helically on to a rigid core.

A "card" winding has one or more layers of wire wound on a thin card of mica or other insulating material.

It will be understood that strip or ribbon could in all cases be used in place of wire. The word "wire" is, therefore, to be construed throughout the specification as including strip or ribbon.

The present invention can be advantageously applied to resistors having all types of low-inductance windings and in particular to resistors having the bifilar and "reversed-section" windings referred to above.

For a better understanding of the invention and to show how the same may be carried into effect, reference will now be made to the accompanying drawings in which.

Figure 1:
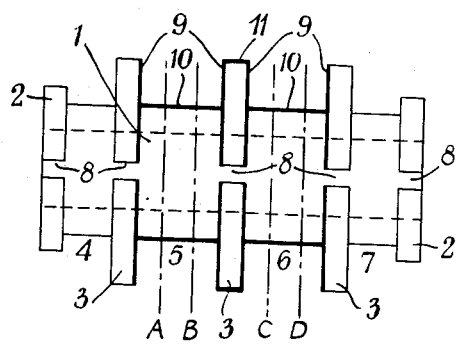
Figure 1 is a side elevation of a resistor core.

The core shown in Figure 1 is in the form of a cylindrical body 1 of "steatite" or other insulating material having two end flanges 2 and three intermediate flanges 3 which are integral therewith and are situated in planes parallel to the core axis, the flanges serving to subdivide the core into four sections 4 to 7, of which the sections 5 and 6 receive the resistance wire, while the sections 4 and 7 receive the terminations. The flanges 2 are of smaller diameter than the flanges 3 and each of the flanges is formed with a radial slot 8, which extends from the periphery of the flange to a radius equal to that of the body 1. The core is about ¾ inch long and it is coated with silver within the sections 5 and 6. Thus, it has a silver covering 9 on each of those faces of the flanges 3 which bound sections 5 and 6, a silver covering 10 on the body 1 between each two adjacent flanges 3, and a silver covering 11 on the periphery of the flange that lies between the sections 5 and 6. The silvering is preferably covered with an insulating varnish (not shown). The silver covering 11 could be omitted and so could the silvering at 10. Instead of using silver, the surface coating could be of gold, copper or other conductive material. In all cases there will be a conductive path very close to the winding.

Figure 2:
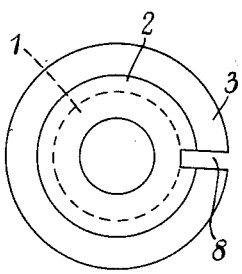
Figure 2 is an end view of the core shown in Figure 1.

As an alternative to the construction just described, a resistor core may be made of copper or other conductive material, in the same shape as the core 1—3 shown in Figures 1 and 2, and covered with insulation, for example a sprayed-on ceramic coating.

A non-inductive resistor having a nominal value of 1,000 ohms was wound on a steatite core having the same shape as the core illustrated in Figures 1 and 2 but without any metallic covering. The winding was produced from a doubled length of insulated resistance wire by a combination of the bifilar and reversed-section methods: the doubled wire was wound in several superposed layers in one direction in section 5 and in the opposite direction in section 6. The doubled wire passed from section 5 to section 6 by way of the slot 8 in the central flange 3. The total number of clockwise turns equalled the total number of anticlockwise turns. A potential consisting of a succession of square pulses, having a long pulse duration as compared with rise time, was applied to the resistor and the variation with time of the current through the resistor was observed on an oscilloscope. The variations with time of the current were similar to those of the potential except that the current could be seen to overshoot, that is to say to rise above the steady state value, and then to oscillate about that value before becoming quiescent. A similar winding was applied firstly to a core that was similar to that used in the first case, but which had the silver coverings 9, 10 and 11 shown in Figure 1, and secondly to an insulated copper core of the same shape. Upon testing these resistors in the same way as the first, a considerable reduction in overshoot was observed and it was clear that any oscillations that occurred died away much more quickly because they could not be detected at all with the apparatus employed.

In another experiment, a resistor of about 800,000 ohms was wound by the reversed section method on a steatite core in accordance with Figures 1 and 2 but without the silver coating. This resistor was tested in the same way as the others and it was found that the overshoot was greater in comparison with the steady state value than it was in the first three tests. Upon testing similar windings on a steatite core as illustrated and having the silver coverings 9, 10, 11, and also on a copper core, even worse results were obtained. It was found that by earthing the conductive part of the core the overshoot could be eliminated but that the leading edge of each current pulse was depressed so that the current approached its steady state value from below, and very slowly. Another, similar, winding was placed on a steatite former of the illustrated design with the illustrated silvering but with the silver covering 10 removed from the portion of the core between the dotted lines marked A and B in Figure 1 and also from the portion between the dotted lines marked C and D. The silvering was thus effectively divided into three distinct sections. Upon earthing the central section of the silvering and testing the resistor as before, it was found that the overshoot was now quite small and so was the depression of the leading edge of the current pulse.

It is considered probable that the factors leading to the good results obtained in the experiments described are various and different factors predominate for different resistors. Thus the success achieved with the 800,000 ohm resistor mentioned above may have been due to introducing a capacitance to earth, or to the effect of the silver coverings 9 in providing screening between the two winding sections, while the effect for the 1,000 ohm resistors may have been due to self-capacitance effects or to electromagnetic damping.

Figure 3:
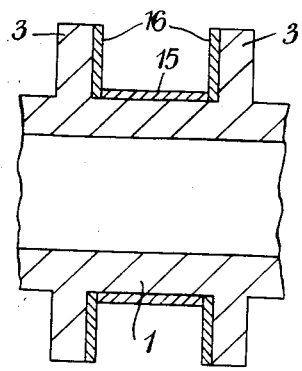
Figure 3 is a sectional side elevation of part of another resistor core.

Figure 3 illustrates an example in which, instead of having deposited coatings, the core of insulating material is provided with copper collars 15 fitting closely around the stem of the core and centrally apertured discs 16 laid upon the cheeks of the flanges. If the core itself is all one piece of material, the collars 15 and discs 16 will have to be split, in which case it may be preferable to make a join in each collar and each disc so that it forms a conductive loop around the magnetic axis of the resistor. It will probably be more convenient to use cores built up from individual parts so that the collars and discs can be fitted onto the former during assembly of those parts and need not, therefore, be split. The collars 15 could be used without the discs 16 or vice versa. The collars and discs will, if employed, be coated with an insulating varnish or other insulating material.

Instead of providing conductive paths near the windings in the ways described above, a resistor could be wound on an insulating core of the shape shown in Figures 1 and 2 and this could be surrounded by a conductive sleeve which fits close to the windings. The sleeve may be of solid metal, or foil, or a conductive paint or paste.

The wire will, of course, be insulated, for example with enamel and/or silk and/or cotton and, although it will be very close to the conductive path, will be insulated from it in the examples so far discussed. However, better results may in some cases be obtained if the wire is connected to the conductive path at one point, such as the centre of the winding, or at one end. When the conductive material is in the form of separate sections insulated from one another, the wire may be joined to each section at one point, or to some sections only.

I claim:

1. A non-inductive wound resistor comprising two spaced, parallel, plate-like, metallic portions, a further portion extending between said metallic portions and a non-inductive, multi-layer winding surrounding said further portion and disposed between said metallic portions with each end of each winding layer very closely adjacent one of said metallic portions.

2. A resistor according to claim 1, wherein said further portion is at least partly metallic and the inner layer of the winding is very closely adjacent that metallic part.

3. A non-inductive wound resistor comprising two spaced, parallel, plate-like metallic portions, a cylindrical metallic portion extending between said plate-like metallic portions, perpendicularly and centrally with respect thereto, and a non-inductive multi-layer winding surrounding said cylindrical portion and disposed between said plate-like portions with each end of each winding layer very closely adjacent one of the plate-like metallic portions.

4. A non-inductive wound resistor comprising a cylindrical core of insulating material, two spaced flanges of insulating material extending from the core and perpendicular to the axis thereof, a non-inductive, multi-layer winding surrounding the core and disposed between the two flanges, and metallic coverings on the inner faces of the flanges, between the flanges and the winding and very closely adjacent the ends of the winding layers.

5. A resistor according to claim 4 and further comprising a metallic covering on the core between the latter and the winding and very closely adjacent the inner layer of the winding.

6. A non-inductive wound resistor comprising a cylindrical core of insulating material, three spaced flanges of insulating material extending from the core and perpendicular to the axis thereof, metallic coverings on both faces of the central flange, on the inner faces of the two outer flanges, on the core between each two adjacent flanges and on the periphery of the central flange, and a multi-layer non-inductive winding situated partly on the core between the central flange and one of the outer flanges and partly on the core between the central flange and the other outer flange, with each end of each winding layer very closely adjacent one of the metallic coverings on the flange faces.

7. A non-inductive wound resistor comprising a cylindrical core of insulating material, three spaced flanges of insulating material extending from the core and perpendicular to the axis thereof, a continuous metallic covering on both faces of the central flange and on the periphery thereof and extending along the core in both directions from the central flange to locations short of the outer flanges, a further metallic covering on the inner face of each of the two outer flanges and a multi-layer, non-inductive winding situated partly on the core between the central flange and one of the outer flanges and partly on the core between the central flange and the other outer flange, with each end of each winding layer very closely adjacent one of the metallic coverings on the flange faces.

8. A resistor according to claim 7 and further comprising metallic coverings on the core extending from the coverings on the outer flanges almost to said continuous metallic covering.

9. A non-inductive wound resistor comprising a metallic stem, two spaced metallic flanges extending from the stem and perpendicular to the axis thereof and a multi-layer, non-inductive winding surrounding the stem and disposed between the two flanges with the ends of the winding layers very closely adjacent the two flanges.

10. A non-inductive wound resistor comprising a cylindrical stem of insulating material, a conductive collar fitting closely around said stem, two spaced flanges of insulating material extending from said stem perpendicular to the axis thereof, an apertured conductive disc laid upon the inner face of each flange and a multi-layer non-inductive winding surrounding the collared stem between the two discs with each end of each winding layer very closely adjacent one of the discs.

11. In combination, a conductive body at earth potential and a non-inductive wound resistor adjacent said body and comprising two spaced, parallel, plate-like, metallic portions, a further portion extending between said metallic portions and a non-inductive, multi-layer winding surrounding said further portion and disposed between said metallic portions with each end of each winding layer very closely adjacent one of said metallic portions, the combination also including an electrical connection between said body and one of said metallic portions.

12. In combination, a conductive body at earth potential and a non-inductive wound resistor adjacent said body and comprising a cylindrical core of insulating material, three spaced flanges of insulating material extending from the core and perpendicular to the axis thereof, a continuous metallic covering on both faces of the central flange and on the periphery thereof and extending along the core in both directions from the central flange to locations short of the outer flanges, a further metallic covering on the inner face of each of the two outer flanges and a multi-layer, non-inductive winding situated partly on the core between the central flange and one of the outer flanges and partly on the core between the central flange and the other outer flange, with each end of each winding layer very closely adjacent one of the metallic coverings on the flange faces, the combination also including an electrical connection between said body and said continuous metallic covering.

13. A resistor according to claim 1 and further comprising an electrical connection between one of said metallic portions and one end of said winding.

14. A resistor according to claim 1 and further comprising an electrical connection between one of said metallic portions and the middle of said winding.

15. A resistor according to claim 7 and further comprising electrical connections between said continuous metallic covering and each of said further metallic coverings, on the one hand, and three separate parts of said winding, on the other hand.

References Cited in the file of this patent

UNITED STATES PATENTS

| | | |
|---|---|---|
| 2,407,171 | McFarren | Sept. 3, 1946 |
| 2,518,225 | Dorst | Aug. 8, 1950 |

FOREIGN PATENTS

| | | |
|---|---|---|
| 164,526 | Great Britain | June 16, 1921 |